United States Patent Office 3,562,233
Patented Feb. 9, 1971

3,562,233
PROCESSES FOR COPOLYMERISING VINYLIC ARYL COMPOUNDS WITH EPOXY ESTERS OF $\alpha,\beta$-UNSATURATED ACIDS
Françoise Lanos, Paris, and Françoise Katzanevas, Bageneux, France, assignors to Societe Nationale des Petroles d'Aquitaine, Courbevoie, France, a corporation of France
No Drawing. Filed Oct. 14, 1968, Ser. No. 767,459
Claims priority, application France, Oct. 20, 1967, 125,267
Int. Cl. C08f 1/11, 19/10
U.S. Cl. 260—86.7                                          15 Claims

ABSTRACT OF THE DISCLOSURE

In a process for the preparation of a soluble copolymer of a vinylic aryl compound and an epoxy ester of an $\alpha,\beta$-unsaturated acid, copolymerisation of a mixture of the monomers is carried out in suspension at a temperature of 20° to 100° C., in the presence of at least one suspension agent and at least one polymerisation catalyst, the epoxy ester being present in a molar ratio of less than 20% with respect to the monomer mixture, and the organic phase and the aqueous phase being in a ratio by volue of 0.2 through 0.8.

---

The invention relates to the preparation of copolymers of vinylic aryl compounds and epoxy esters of $\alpha,\beta$-unsaturated acids by a suspension polymerisation process. It is more particularly applicable to the production of copolymers of styrene and acrylic glycidol esters.

The invention is also concerned with the new copolymers obtained by this process.

The preparation of copolymers of styrene and glycidol esters has already been proposed. However, the processes hitherto suggested for this purpose have a number of disadvantages and the products which are obtained do not always offer the characteristics demanded by industry. One of the qualities which the styrene-glycidol esters are required to have is that of dissolving in the usual solvents. A soluble polymer has an uncrosslinked, linear structure; it is easily shaped or worked. An insoluble polymer has a cross-linked structure and it is difficult to work, and when such a polymer is used, costs are greatly increased.

The degree of crosslinking can be expressed by the gelling rate, i.e. by the percentage by weight of insoluble products.

It will be readily understood that the insolubility of a polymer and its gelling rate play an important part in the considerations which manufacturers have to take into account and this has led to much research being carried out which is directed towards obtaining uncrosslinked polymers.

The difficulty in obtaining uncrosslinked copolymers of styrene and glycidol esters is due to the difunctional character of the glycidyl methacrylate (that is to say, the existence of the epoxy function and the double bond), to which is added the carboxylic ester grouping.

The radical homopolymerisation of glycidyl methacrylate is effected through the double bond and leads to epoxidised products which have a strong tendency to crosslinking.

By the radical copolymerisation in bulk of styrene and glycidyl methacrylate, an epoxidised product is obtained which generally is soluble in benzene provided the glycidyl methacrylate is in a molar proportion smaller than that of the styrene. If there is a too large proportion of glycidyl methacrylate, the product is crosslinked. However, the technology of the bulk process is difficult and the products obtained are not always homogeneous.

Styrene and glycidyl methacrylate can also be copolymerised in solution. The products obtained are soluble, but they have a low molecular weight which is of the order of 70,000 to 80,000.

No suspension process for the preparation of soluble styrene-glycidyl methacrylate copolymers which would be capable of industrial application has been proposed up to now. Hitherto the copolymers obtained have been completely or partially insoluble, even when the proportion of glycidyl methacrylate is relatively low. The presence of suspension agents and the aqueous medium favours the tendency of the glycidyl methacrylate to crosslink the polymers. Certain suspension agents open the epoxy ring and react with this group, thus creating bridges between the chains. The mechanical properties of the polymers as modified, the melting and softening points are raised and the hardness is increased, while the elasticity is reduced. The polymer is then unsuitable for moulding and extruding operations; and yet suspension processes are simpler from the technological point of view than bulk processes. The fact that a crosslinked polymer is obtained in large proportions, which can be controlled only with difficulty, thus constitutes a very serious handicap as regards the technological operations which subsequently have to be carried out on the copolymer for the shaping thereof. With the object of being able easily to treat the polymers so as to transform them into objects of various shapes, it is thus necessary to obtain, by copolymerisation of styrene and glycidyl methacrylate, a product which either is not crosslinked or is only so in very small proportions.

The present invention enables one to obtain by a suspension process, a copolymer of styrene and an epoxy-acrylic ester which is soluble in benzene and the usual solvents for vinyl polymers.

The invention is more particularly concerned with a process for the suspension copolymerisation of styrene and glycidol esters in the presence, either separately or in association, of suspension agents and certain protective colloids.

In order to facilitate and stabilise the dispersion of the monomers in the aqueous phase, and also to protect the surface of the balls which are formed and thus to prevent the agglomerations which might otherwise be produced during the coalescence period, it has been proposed to make use of an organic or mineral polyelectrolyte of a colloidal nature, as for example: alginates, starch, gelatine, the basic phosphates of calcium, magnesium, barium and zinc, hydroxyapatite, magnesium silicate, calcium carbonate or bentonite. It is also possible to employ a polyol, such as polyvinyl alcohol, carboxymethylcellulose or a polyethylene glycol.

The suspension agents used in carrying out the process of the invention may be organic polyhydroxyl compounds such as carboxymethylcellulose and polyvinyl alcohols.

Those protective colloids, such as gelatine and polyvinylpyrrolidone, which carry azo-functions, which would cause the crosslinking of the polymers, are to be avoided. Mineral colloids are preferred, such as, for example, tricalcium phosphate or hydroxyapatite, which can be associated with the polyhydroxyl suspension agents.

It is quite surprising to find that, while the mineral colloids are not very suitable when used separately, they give excellent results when they are associated with the hydroxylated organic compounds and used in certain proportions.

Among the polyvinyl alcohols, it is preferred to employ those which have a viscosity between 5 and 70 centipoises at 20° C. for 4% aqueous solutions and saponification indices which are between 10 and 200 (the saponification index being the number of mg. of potash necessary for saponifying 1 g. of product). These suspension agents are used by themselves or associated with a mineral colloid selected from those which have already been mentioned: tricalcium phosphate or hydroxyapatite. The tricalcium phosphate can be prepared in situ in the suspension medium by precipitation, from trisodium phosphate and an excess of soluble calcium salt.

In order to obtain soluble copolymers of styrene and glycidol esters, it is necessary to observe specific working conditions as regards the ratio between the organic phase and the aqueous phase, the proportion of suspension agents in the aqueous medium and the copolymerisation temperature.

These conditions vary with the proportion of glycidol ester in the mixture of monomers. For any given mixture of styrene and glycidyl methacrylate, or other glycidol ester, one can determine exactly the experimental conditions which will lead to a soluble copolymer.

Taking into account possible variations in the content of glycidyl methacrylate in the mixture of monomers, the working limits will be contained within the following intervals: when the carboxymethyl cellulose or the polyvinyl alcohol is employed alone as the suspension agent, they are used in amounts between 0.01 and 3% and preferably 0.05 to 1% by weight of the total of the monomers used.

When the suspension agent is used in association with a mineral colloid, these limits are lowered and are between 0.01 and 0.5% by weight of the monomers. The tricalcium phosphate is used in the proportion of 0.05 to 3%, and preferably 0.1 to 1%, by weight of the monomers. The quantity of phosphate depends on the quantity of glycidyl methacrylate introduced into the medium. When the quantity of methacrylate increases, it is necessary to reduce the quantity of the phosphate.

In order to assist dispersion, it is also possible for surface-active agents to be dissolved in the aqueous phase, these agents being such as sodium oleate and sodium dodecyl benzene sulphonate and being used in very small proportions (0.001 to 2% by weight) of the monomers; this addition has no influence on the solubility of the product which is obtained.

The ratio by volume between the organic phase and the aqueous phase, defined by the expression: organic phase volume/aqueous phase volume, will be between 0.2 and 0.8 and preferably between 0.3 and 0.6.

The molar proportion of epoxyacrylic ester in the mixture of monomers is less than that of the styrene and is preferably below 20%. The polymerisation temperature is between 20° and 100° C. and preferably between 60° and 90° C.

The polymerisation catalysts can be selected from those compounds which generate free radicals and which are capable of being dissolved in the monomer mixture, and which have a slow speed decomposition temperature close to that of the copolymerisation medium; for example, it is possible to employ benzoyl peroxide, or azo-di-isobutyronitrile. These catalysts are employed in the proportion of 0.1 to 2% by weight of the monomers being used.

The suspension copolymerisation process according to the present invention makes it possible for the following copolymers, which are mentioned as non-limiting examples, to be obtained: styrene-glycidyl methacrylate and styrene-vinyl toluene. It covers all copolymers of styrene and vinylic aryl compounds or the substitution derivatives thereof with the glycidol esters of $\alpha,\beta$-unsaturated acids of the general formula:

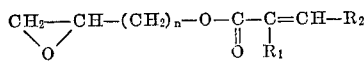

wherein $R_1$ and $R_2$ each represent hydrogen or an aryl hydrocarbon group with 6 to 12 carbon atoms, or an alkyl hydrocarbon group with 1 to 12 carbon atoms, while $n$ can vary from 1 to 20.

The following non-limiting examples illustrate the invention. They show the influence of the various parameters discussed, on the quality of the polymer which is obtained.

EXAMPLE 1

Using a 10-litre Grignard reaction vessel, 30 g. of polyvinyl alcohol, having a saponification index of 100 and a viscosity of 13 centipoises at 30° C. in 4% solution, are dissolved in 5 litres of demineralised water and heating takes place until the temperature has reached 80° C. Under the effect of moderate agitation, a mixture of 1350 g. of destabilised styrene, 150 g. of freshly distilled glycidyl methacrylate (10% by weight of the total monomers) and 7.5 g. of benzoyl peroxide is introduced; the temperature is maintained at 80° C. for 7½ hours. The polymer obtained is filtered, washed and dried in an oven at 60° C. for 24 hours. There are thus collected 1140 g. of dry polymer (yield 76%) in the form of balls having a diameter between 0.1 and 1 mm. The polymer obtained is transparent and soluble in benzene, while its intrinsic viscosity is 0.70 cc./g. and it contains 0.88% by weight of epoxidic oxygen.

EXAMPLE 2

The general working conditions are the same as in Example 1; the mixture of monomers comprises 1200 g. of styrene and 300 g. of glycidyl methacrylate (20% by weight of the total of the monomers); the polymer obtained is not completely soluble in benzene; it has an intrinsic viscosity of 2.20 cc./g. and contains 1.26% by weight of epoxidic oxygen; traces of gel can be detected.

This example shows that when the proportion of glycidyl methacrylate used is 20%, the polymers obtained already have a marked insolubility characteristic.

EXAMPLE 3

This example is similar to Example 1, but using 15 g. of the same polyvinyl alcohol instead of 30 g., 1200 g. of a transparent polymer completely soluble in benzene is obtained, the polymer having an intrinsic viscosity of 2.21 cc./g. and containing 0.85% by weight of epoxidic oxygen.

EXAMPLE 4

Using a 10-litre reaction vessel, 20 g. of carboxymethyl cellulose are dissolved in 5 litres of water and heating to 75° C. takes place: a mixture of 1350 g. of styrene destabilised by washing with 10% sodium hydroxide solution, 150 g. of glycidyl methacrylate which has not been destabilised, and 7 g. of benzoyl peroxide is introduced. The temperature of the mixture is brought up to 88° C., while stirring vigorously in order to keep the medium in suspension. Reaction is allowed to take place for 7 hours. The polymer which forms is filtered, washed and dried. The balls have an average diameter between 0.3 and 1 mm. This polymer is completely soluble in benzene; it has an intrinsic viscosity of 1.64 cc./g. and it contains 0.89% by weight of epoxidic oxygen.

EXAMPLE 5

Using the same reaction vessel as before, 8 g. of polyvinyl alcohol (saponification index 100.8, viscosity 14 centipoises at 30° C. in 4% solution) and 7.4 g. of trisodium phosphate hydrate ($Na_3PO_4 \cdot 12H_2O$) are dissolved in 5 litres of water while stirring at 300 r.p.m. A solution obtained by dissolving 10 g. of calcium chloride in 0.5 litre of water is added; the tricalcium phosphate precipitates within the aqueous medium and heating takes place until the temperature of this aqueous suspension has reached 80° C. The same stirring speed is maintained and a mixture of 1350 g. of destabilised styrene, 150 g. of glycidyl methacrylate and 7 g. of benzoyl peroxide is introduced. The temperature is allowed to reach 88° C. and it is kept at this level for 7 hours. The product obtained is filtered, washed and dried at 80° C. 1337 g. of a polymer (yield 89%) is obtained, the polymer being transparent and soluble in benzene; its intrinsic viscosity is 1.85 cc./g. It contains 0.85% by weight of epoxidic oxygen.

EXAMPLE 6

The same conditions as Example 5, but using 8 g. of a polyvinyl alcohol (saponification index 156.5; viscosity 29 centipoises at 30° C. in 4% solution). A polymer is obtained with a yield of 88.5% in the form of balls, these being soluble in benzene; intrinsic viscosity 1.29 cc./g., content of epoxidic oxygen 0.98% by weight.

EXAMPLE 7

Same conditions as Example 6; there is added in the aqueous phase 5 g. of "Santomerse" (sodium alkaryl sulphonate). A polymer in the form of balls is obtained with a yield of 88%, the polymer being soluble in benzene; intrinsic viscosity 1.67 cc./g., content by weight of epoxidic oxygen; 0.81%

EXAMPLE 8

Using the same Grignard reaction vessel, there are added: 3.5 litres of demineralised water, 8 g. of polyvinyl alcohol (ester index: 156.5, viscosity 29 centipoises at 30° C. in 4% solution) and 7.4 g. of $Na_3PO_4 \cdot 12H_2O$; an aqueous solution obtained by dissolving 10 g. of $CaCl$ in 0.4 litre of demineralised water is introduced while stirring. The tricalcium phosphate precipitates and heating is carried out to reach a temperature of 75° C. A mixture of 2106 g. of destabilised styrene, 234 g. of glycidyl methacrylate and 10 g. of benzoyl peroxide is added. The temperature reaches 87° C.; this is maintained for 7½ hours. A polymer in the form of balls is obtained with a yield of 89.5%, the said polymer being particularly crosslinked and containing 5% of insoluble products in gel form.

By comparison with Example 6, this example shows the influence on the gel formation of the increase in the ratio between the organic phase and the aqueous phase, by volume.

EXAMPLE 9

This example is similar to Example 1, but using 25 g. of gelatine as the protective colloid instead of polyvinyl alcohol, a crosslinked polymer is obtained with a yield of 87%, this polymer containing 32% by weight of insoluble products in gel form.

EXAMPLE 10

This example is similar to Example 1, but using 30 g. polyvinyl pyrrolidone K–60 as suspension agent, a crosslinked polymer is obtained.

We claim:

1. A process for the preparation of an organic solvent soluble copolymer of a vinylic aryl compound and an epoxy ester of an α,β-unsaturated mono-basic acid, comprising carrying out copolymerisation of a mixture of monomers of said vinylic aryl compound and said epoxy ester in suspension in a reaction medium at a temperature of 20° to 100° C., in the presence of at least one organic polyhydroxyl suspension agent and at least one free radical polymerisation catalyst, said epoxy ester being present in a molar ratio of less than 20% with respect to said monomer mixture and said reaction medium comprising an organic phase and an aqueous phase in a ratio by volume of 0.2 through 0.8.

2. A process according to claim 1, in which said suspension agent is associated with at least one mineral colloid.

3. A process according to claim 1, in which said suspension agent is used without an associated mineral colloid, said suspension agent being present in a proportion by weight of 0.01 to 3% with respect to said monomer mixture.

4. A process according to claim 3, in which said suspension agent is present in a proportion of 0.05 to 1% by weight with respect to said monomer mixture.

5. A process according to claim 1, in which said suspension agent is associated with at least one mineral colloid, said suspension agent being present in a proportion of 0.01 to 0.5% by weight with respect to said monomer mixture.

6. A process according to claim 5, in which said mineral colloid is present in a proportion of 0.05 to 3% by weight with respect to said monomer mixture.

7. A process assording to claim 6, in which said mineral colloid is present in a proportion of 0.1 to 1% by weight with respect to said monomer mixture.

8. A process according to claim 1, in which said suspension agent is selected from the group cvomprising carboxymethyl cellulose and polyvinyl alcohols.

9. A process according to claim 1, in which said mineral colloid is selected from the group comprising tricalcium phosphate and hydroxyapatite.

10. A process according to claim 1, in which said polymerisation catalyst is selected from the group comprising benzoyl peroxide and azo-di-iso-butyronitrile.

11. A process according to claim 1, in which said epoxy ester is of the general formula:

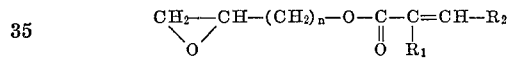

wherein $R_1$ and $R_2$ are each selected from the group consisting of hydrogen and hydrogen radicals and $n$ is from 1 to 20.

12. A process according to claim 1, in which said epoxy ester is of the general formula:

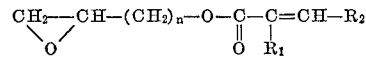

wherein $R_1$ and $R_2$ are each selected from the group consisting of aryl radicals containing 6 to 12 carbon atoms and alkyl radicals containing 1 to 12 carbon atoms and $n$ is from 1 to 20.

13. A process according to claim 1, in which said epoxy ester is a glycidol ester of an α,β-unsaturated acid.

14. A process according to claim 1, in which said epoxy ester is glycidyl methacrylate.

15. A process according to claim 1, in which said vinylic aryl compound is selected from the group comprising styrene, vinyl toluene and substitution derivatives of these compounds.

References Cited

UNITED STATES PATENTS

| | | | |
|---|---|---|---|
| 2,556,075 | 6/1951 | Erickson | 260—88.3 |
| 2,857,354 | 10/1958 | Fang | 260—33.2 |
| 2,994,670 | 8/1961 | D'Alelio | 260—2.5 |

JOSEPH L. SCHOFER, Primary Examiner

J. KIGHT III, Assistant Examiner

U.S. Cl. X.R.

260—2